United States Patent
Feng et al.

(10) Patent No.: US 9,615,056 B2
(45) Date of Patent: Apr. 4, 2017

(54) SYSTEM AND METHOD FOR VIDEO COMMUNICATION ON MOBILE DEVICES

(75) Inventors: Chang Feng, Belle Mead, NJ (US); Asher Shiratzky, Tel-aviv (IL); Eyal Elyashiv, Ramat Hasharon (IL)

(73) Assignee: OOVOO, LLC, New York, NY (US)

( * ) Notice: Subject to any disclaimer, the term of this patent is extended or adjusted under 35 U.S.C. 154(b) by 0 days.

(21) Appl. No.: 13/024,700

(22) Filed: Feb. 10, 2011

(65) Prior Publication Data

US 2012/0066596 A1    Mar. 15, 2012

Related U.S. Application Data

(60) Provisional application No. 61/303,211, filed on Feb. 10, 2010.

(51) Int. Cl.
*G06F 3/00* (2006.01)
*H04N 7/14* (2006.01)
*H04N 7/15* (2006.01)

(52) U.S. Cl.
CPC ............... *H04N 7/148* (2013.01); *H04N 7/15* (2013.01)

(58) Field of Classification Search
CPC combination set(s) only.
See application file for complete search history.

(56) References Cited

U.S. PATENT DOCUMENTS

| | | | |
|---|---|---|---|
| 6,879,828 B2 * | 4/2005 | Virtanen et al. | 455/434 |
| 2007/0263076 A1 * | 11/2007 | Andrews et al. | 348/14.08 |
| 2009/0037826 A1 * | 2/2009 | Bennetts | 715/753 |

* cited by examiner

*Primary Examiner* — Jeffrey A Gaffin
*Assistant Examiner* — Ayesha Huertas Torres
(74) *Attorney, Agent, or Firm* — McDermott Will & Emery LLP (57) ABSTRACT

A video teleconferencing system which allows a mobile device to conduct teleconferences over fixed and mobile packet networks with end points with other mobile devices or a personal computer. The mobile device includes a user interface that displays a video image associated with a first participant. A selectable user interface element corresponding to a second participant video image may be displayed on the user interface and in response to selection of the selectable user interface element, a video image associated with the second participant may be displayed.

28 Claims, 7 Drawing Sheets

SYSTEM AND METHOD FOR VIDEO COMMUNICATION ON MOBILE DEVICES

CROSS REFERENCE TO RELATED APPLICATIONS

This Application claims the priority of U.S. Provisional Application No. 61/303,211 entitled "System and Method for Video Communication on Mobile Devices" filed on Feb. 10, 2010, and hereby incorporates by reference that application.

FIELD OF THE INVENTION

The present invention relates generally to video teleconferencing, and specifically to methods and systems for video teleconferencing over fixed and mobile packet networks with end points including personal computer as well as handheld mobile devices.

BACKGROUND OF THE INVENTION

Video teleconferencing is well known in the art as a means for allowing remote parties to participate in a conversation. Voice, video, and optionally other data are transmitted between parties over a communication network, such as the Internet. The parties are able to see, speak to, and hear the other parties, as well as share other data such as a slide presentation.

Being able to conduct video communication on a mobile device is relatively new development in the art. So called 3G video telephony service based on the ITU H.324M standard is the best known practice in the field. This technology leverages 64 kbps circuit-switched transmission channel to send and receive compressed digital audio visual signals. Due to the inherent limitation of channel bandwidth and processing power available on 3G mobile handsets, the technology suffers from poor audio and video quality which has prevented the service from being widely adopted.

More recent efforts have focused on delivering mobile video communications over packet-switched mobile networks. IMS (Integrated Multimedia Subsystem) is a technology originally devised by the wireless standards body 3GPP in an effort to unify the signaling and transmission of multimedia data including audio and video over the IP (Internet Protocol) layer which in turn can be supported on a variety of lower layer networks such as GPRS, Wireless LAN, CDMA 2000, and fixed line. There has been limited deployment of IMS capable mobile networks and still fewer video communication service offerings that leverage on IMS. AT&T Video Share offers one-way video transmission between two Video Share capable handsets and is powered by IMS, while relying on the regular cellular voice channel for the audio portion of the communication.

BRIEF SUMMARY OF THE INVENTION

The present invention is directed to methods, systems, and software for use in packet-based video teleconferencing on mobile client devices. The methods permit mobile client devices to exchange video images and audio data with other mobile client device as well as personal computer clients in a multipoint conference via a server on the Internet or other packet network. Alternatively, point-to-point conferences between two mobile client devices or a mobile client device and a personal computer client, with or without a dedicated server, are also supported. The core mechanism for conducting such a multipoint or point-to-point video conference has been previously disclosed in U.S. patent application Ser. No. 11/890,382, the disclosure of which is incorporated herein by references. The present invention focuses on the methods, systems, and software that enable mobile devices to participate in such a video conferencing system. Further, the methods disclosed in the present invention can easily be applied by those skilled in the art to enable mobile device participation in other types of video conferencing systems.

An object of the invention is to minimize battery power consumption while supporting video conferencing usage on mobile devices.

A second object of the invention is to leverage on bandwidth available to the mobile device provided by multiple underlining networks to achieve enhanced audio and video communication quality of service that is otherwise not able to be achieved with any single connected network.

A third object of the invention is to maintain continuous connectivity for the mobile device to participate in a video conferencing session when the mobile device may be moving in and out of coverage of a particular network.

A fourth object of the invention is to support multipoint video conferencing on a mobile device with limited display size.

A fifth object of the invention is to enable the mobile client to be able to conduct video calls with remote parties who are not registered users on the same video conferencing system.

To achieve the first object, a system and method is provided whereby the mobile video conferencing client software is divided into two components—a background component and a foreground component. Conventional video conferencing client software consists of a single machine executable binary program image that is loaded in its entirety into the target processor memory space in order to provide the full set of desired functionality. Such practice, when applied on mobile devices, causes high power and memory consumption due to the computational complexity of video conferencing application, and renders unsatisfactory mobile user experience. By separating the client software into two components, a background component and a foreground component, the background component can be persistently loaded in processor memory even during device's power saving period as its only functionality is to maintain a light weight connection to the video conferencing server for incoming call notification. When user-driven, UI oriented features are required, and the foreground component can then be loaded into processor memory space for the duration that such functionality is needed. For example, in one embodiment of the present invention, the background component contains only the minimum functionality of maintaining the mobile client's online presence (so other clients can see the mobile client is up and available for communication) and ability to receive an incoming video call. Upon receiving an incoming video call notification, the foreground component is launched which then provides functionality for delivering the full range of services offered by the particular video conferencing system.

To achieve the second object, a system and method is provided whereby data transmission bandwidth available from individually connected mobile networks on the mobile device are combined to allow the mobile client to provide a higher level quality of service for the mobile video conferencing application. Mobile devices often support connectivity to multiple networks, such as 3G, 4G, and Wi-Fi networks. In an embodiment of the present invention, the combined bandwidth can be used to send out a higher bit rate video stream to provide higher video image quality. In another embodiment of the invention, a portion of the combined available bandwidth may be used to transmit error protection data packets. In another embodiment of the invention, layered video coding technique is used to compress the video signal and different layers of the compressed video may be transmitted on different available mobile networks. Characteristics of each connected network channel can be collected and analyzed to determine the best allocation of the corresponding bandwidth resource for audio, video and/or data transmission during a conferencing session.

To achieve the third objective, a system and method is provided to enable application layer handover during a video conferencing session when a mobile client device moves across different types of mobile network coverage, for example, from 4G to 3G, or from cellular networks to WiFi networks. During a network switching event, the audio and video data transmission can be switched over to the now active channel(s) therefore providing continuous service to the mobile client.

Auxiliary information may be collected and analyzed to predict when such an application layer handover is necessary to provide an efficient transition and provide a seamless transition experience. For example, in an exemplary embodiment, the location information reported by the on board GPS system can be used to check against an up-to-date signal coverage map to anticipate if the mobile device is moving into or out of a particular coverage area, or whether a significant change in signal strength level might occur soon. Such information can be used to prepare the system for hand-over.

Sometimes a mobile device may lose data connection and may be left only with a phone connection. In this case the conferencing server automatically dials the phone number associated with the mobile client to allow the mobile device to continue to participate in an ongoing conferencing session. When a data connection is resumed, the mobile client device reconnects back to the conferencing session and the server will subsequently drop the voice connection to the mobile device.

To achieve the fourth object, a system and method is provided to enable a user to view video images from participants in a multipoint video conferencing session on mobile devices with limited display size. Conventional video conferencing end points typically display video images from all participants in a video conferencing session on a single or sometimes multiple video displays. Such a practice is not possible on mobile devices due to their limited size displays. In an embodiment of the present invention, only one video participant's video image is displayed on the mobile device at any time during a multi-point video conferencing session. A pull up menu on the mobile device contains a list of all current participants in the video conferencing session. Each participant is associated with a thumbnail that is periodically refreshed. The user may select any one of the participants to display the said participant's full size video stream in the device's main display area. It should be apparent to those skilled in the art that the foregoing is illustrative only and not limiting, having been presented by way of example only. For example, many other ways of presenting the participants' list are possible.

In accordance with the fourth object, a mobile communication device comprising a user interface and a computer-readable medium having executable computer-readable program code embodied therein, the executable computer-readable program code for implementing a method for communication is provided. The method comprises displaying on the user interface a video image associated with a first participant; displaying on the user interface a selectable user interface element corresponding to a second participant video image; and, displaying on the user interface a video image associated with the second participant in response to selection of the selectable user interface element. The method may also comprise the step of displaying on the user interface a second selectable user interface element where selection of the second selectable user interface element causes the user interface to display the selectable user interface element corresponding to the second participant video image. The video image associated with the first participant is captured at a second mobile communication device and the video image associated with the second participant is captured at a third mobile communication device.

The user interface element may be a thumbnail image of a second participant associated with the second participant video image and may be periodically updated with new images associated with the second participant video image. It is possible that the mobile communication device may receive from a server, video data packets having data corresponding to the video image associated with a first participant. The mobile communication may decode the received data packets to display on the user interface the video image associated with a first participant.

In another example, a method for communication between a server one or more mobile communication devices is disclosed to achieve the fourth object. The method includes the steps of establishing a communication link between a server, a first mobile communication device, a second communication device and a third communication device; transmitting to the first mobile communication device a video image associated with a first participant; receiving at the server a request for transmission of a video image associated with a second participant; and transmitting to the mobile communication device a video image associated with a second participant in response to receiving at the server a request for transmission of a video image associated with a second participant. The server may receive the video image associated with the first participant from the second communication device and receives the video image associated with the second participant from the third communication device. The second communication device and the third communication device maybe mobile communication devices or personal computers. The method may further comprise the step of stopping transmission to the first mobile communication device of a video image associated with a first participant when the server receives a request for transmission of a video image associated with a second participant from the first mobile communication device The method may also comprise the steps of displaying on a user interface of the first mobile communication device a video image associated with a first participant; displaying on the user interface of the first mobile communication device a selectable user interface element corresponding to the second participant video image; receiving at the first mobile communication device a video image associated with a second participant in response to selection of the selectable user interface element; and, displaying on the user interface a video image associated with the second participant. The user interface element may be a thumbnail image of a second participant associated with the second participant video image and may be periodically updated with images associated with the second participant video image. The method may also include the step of displaying on the user interface of the first mobile communication device a second selectable user interface element wherein selection of the second selectable user interface element causes the user interface to display the selectable user interface element corresponding to the second participant video image In further accordance with the fourth object, a method for communication on a mobile communication device is provided. The method includes the steps of displaying a video image associated with a first participant; displaying a selectable user interface element corresponding to a second participant video image; and, displaying a video image associated with the second participant in response to selection of the selectable user interface element. The video image associated with the first participant is captured at a second mobile communication device and the video image associated with the second participant is captured at a third mobile communication device. The user interface element may be a thumbnail image of a second participant associated with the second participant video image and may be periodically updated with images associated with the second participant video image.

The mobile communication device may receive from a server, video data packets having data corresponding to the video image associated with a first participant and decodes the received data packets to display on the user interface the video image associated with a first participant.

To achieve the fifth object, a system and method is provided for the mobile client to initiate and establish video calls with parties who are not registered users on the same video communication system as the mobile video conferencing client. Traditional video conferencing systems allow calls to be established between users who are registered on the same video communication system, via pre-established routing rules associated with a specific call signaling protocol. Sometimes a gateway device may be used to route calls across different video communication systems, in which case the remote user must be a video communication end point that speaks one of the well known video communication protocols understood by the gateway. Such limitations significantly reduce the number of potential users a mobile client may be able to reach, presenting a significant barrier for broader adoption of the video communication service. The present invention solves this issue by providing a system and method whereby a mobile client can establish video calls with out-of-network users who are reachable via any of the available communication means on the mobile device. The initial call invitation is sent in text format via Email, SMS, IM, or other possible mechanisms associated with the intended remote party. The invitation message contains a URL corresponding to the mobile client's unique web call-me link assigned by the video conferencing system. Upon receiving the call invitation message, the receiving party is instructed to click on the embedded call-me link which will launch a web browser that loads the necessary software component and opens a video call session with the mobile client.

These and other aspects, objects and embodiments will be more apparent when read with the accompanied detailed description and drawings.

DETAILED DESCRIPTION OF THE INVENTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various technologies described herein generally relate to video teleconferencing and more specifically to methods and systems for video conferencing over fixed and packet networks with end points, such as personal computers and mobile devices.

Figure 1:
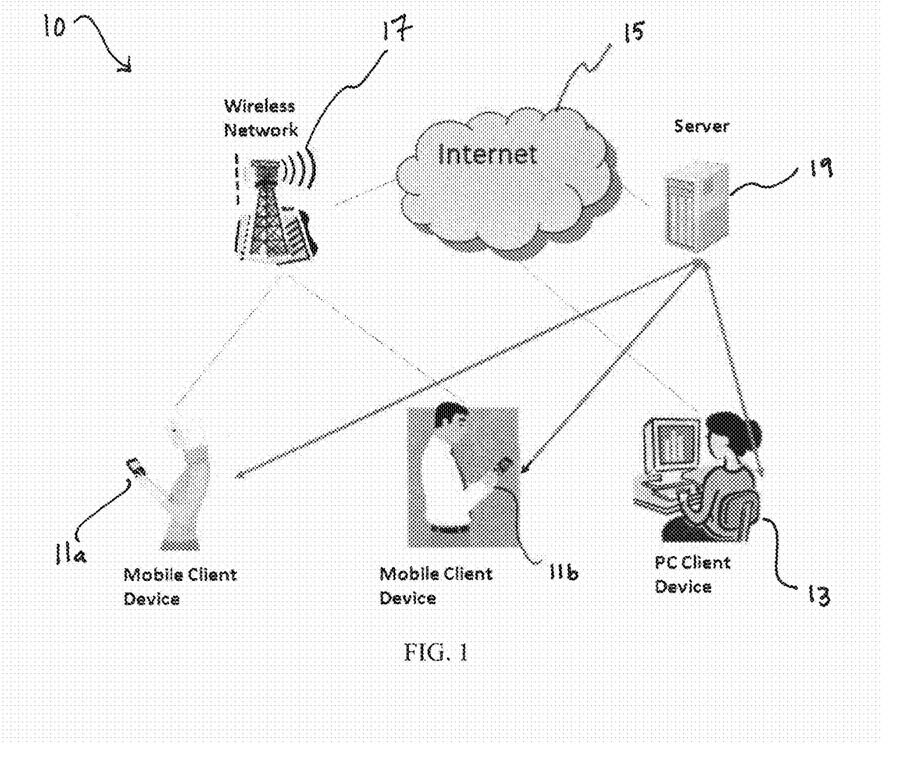
FIG. 1 shows a schematic, pictorial illustration of a system for video teleconferencing between mobile and PC client devices, in accordance with an embodiment of the present invention.

FIG. 1. illustrates a high-level schematic of a video teleconferencing system 10 for video teleconferencing between multiple devices, such as for example one or more mobile client devices 11a, 11b (generally referred to as 11) and one or more personal computer (PC) client devices 13. The mobile client devices 11 may send data and communicate over the Internet 15 with other devices 11, 13 via a wireless communications network 17. The wireless communications network 17 may be a 3G network or 4G network, WiFi or any other network protocol or by a combination of networks. In the case of some wireless communications networks, a wireless network tower may be used. As shown in FIG. 1 by the lines with arrows, logically each device may communicate with each other by sending data to and receiving data from a server 19. In one example, the server 19 may be an audio server, a video server, or an audio/video server. It is also understood that the system may include one or more dedicated servers, such as a dedicated audio server and a dedicated video server.

Figure 2A:
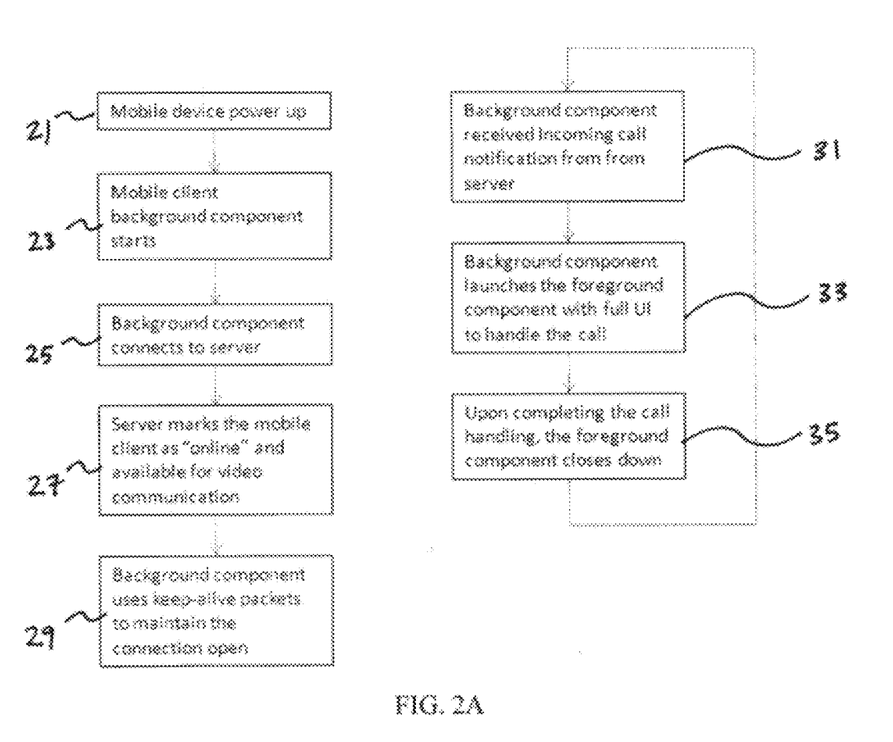
FIG. 2A shows a flow chart that schematically represents a method for initiating video conferencing on the mobile client device by background and foreground components, in accordance with an embodiment of the present invention.

FIG. 2A illustrates a flow chart that schematically represents a method for initiating video conferencing on the mobile client device 11 by background and foreground components. At mobile client device power up 21, a mobile client background component is loaded into the mobile device's processor memory and starts execution 23. This mobile client background component 25 connects to a communication server over the IP layer provided by any available data channel of the underlying wireless network, such as 3G, 4G and WiFi. Preferably, the mobile client device 11 needs to possess the necessary credentials on the target video conferencing system to connect to the communications server. Once connected, the mobile client is considered to have successfully logged onto the video communication service. The server will then notify other clients connected to the service that this mobile client is available for video communication 27. The mobile client sends periodic keep-alive packets to the communication server to maintain the connection's valid open status 29. The frequency of such keep-alive packets are configured with a goal to minimize battery usage, for example, set at every 30 min. However, it is understood that other time periods may also be used.

When a remote client initiates a video call request to the mobile client, the request is routed via the communication server and sent down to the mobile client via the above described connection maintained between the server and the background component of the mobile client 31. Upon receiving an incoming call message, the background component then launches the foreground component via mechanisms supported by the particular mobile operating system the mobile device is operated on 33. Once loaded into the processor memory, the foreground component presents a Graphic User Interface on the mobile device's display screen through which the full functionality of the mobile video conferencing client can be accessed by the user 33. Upon completion of call handling, the foreground component closes down 35.

Figure 2B:
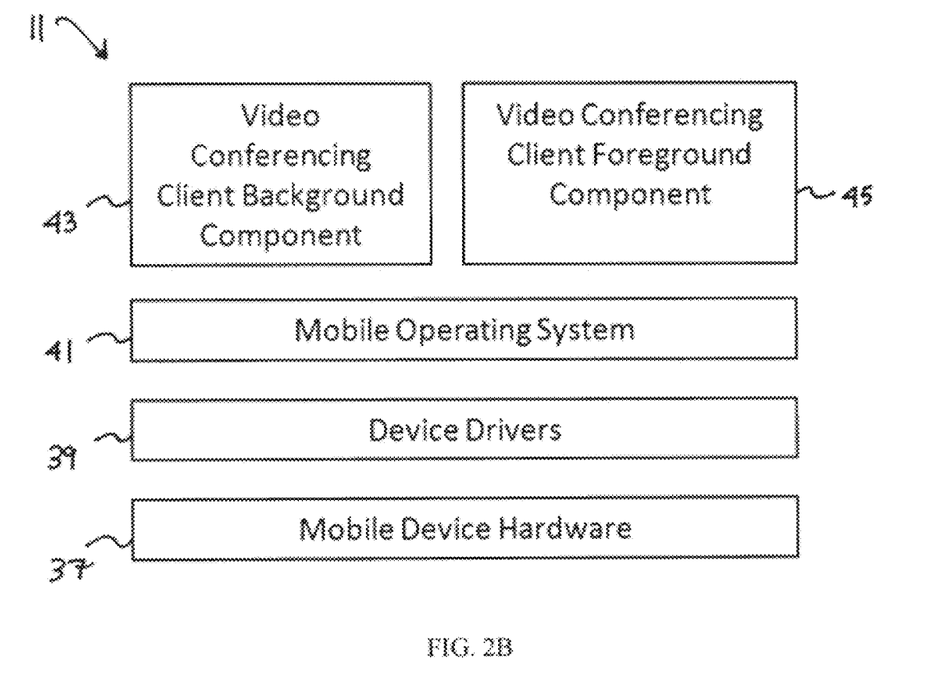
FIG. 2B illustrates a schematic diagram of an example of a mobile client device, in accordance with an embodiment of the present invention.

FIG. 2B illustrates a schematic diagram of an example of a mobile client device 11. The mobile device may include different schematic layers, including a mobile device hardware layer 37, one ore more device drivers 39, a mobile operating system 41, a video conferencing client background component 43 and a video conferencing client foreground components 45. The video conferencing components operate as described above.

Figure 3:
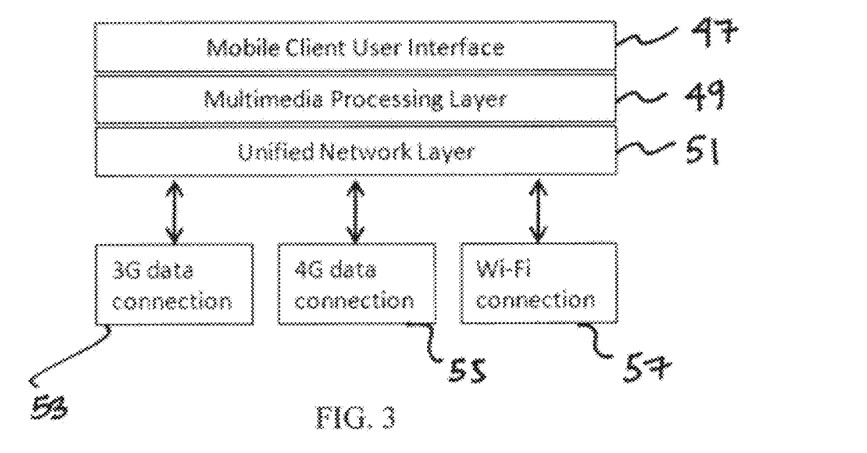
FIG. 3 shows a schematic illustration of a system that bundles three available network data connection channels available to be used in a video conferencing session, in accordance with an embodiment of the present invention.

Referring now to FIG. 3, the mobile client device 11 may include a mobile client user interface 47, a multimedia processing layer 49, and a unified network layer 51. The mobile client user interface layer 47 handles interaction with users and allows a user to control the operation of the client program. It also renders on the device received audiovisual signal of remote video conferencing participants. The multimedia processing layer 49 manages the capturing and encoding of audio and video signals from the device hardware, as well as the decoding and rendering of audio and video signals received from remote conference participants. The unified network layer 51 handles the packaging and transmission of the encoded audio and video data, together with auxiliary information, down to an abstract interface representing the underlining data networking connection(s). The unified network layer 51 also collects data packets received from the underlining data networking connections and presents the data up to the media processing layer as a single logical network interface.

The mobile client device may also include 3G, 4G, and WiFi interfaces 53, 55, 57 for interfacing with 3G, 4G, and WiFi networks. When establishing a video communication on a mobile client device 11, the mobile client device 11 may sense the type of data connections available on the mobile client device 11. As noted, the available data connections may include, for example, 3G, 4G, and WiFi connections, If only one connection is detected, the mobile client device 11 uses this single data channel to send and receive audio and video data. If multiple connections are detected, the mobile client device 11 establishes independent transmission channels to the video conferencing server on each of the available communication networks.

The characteristics of the available channels are analyzed to determine how much bandwidth of each channel is available for audio and video transmission while meeting a predetermined minimum quality of service level. Net aggregated bandwidth is then reported to the mobile client application layer as the current available transmission bandwidth which is then used by the mobile client to determine the actual transmission bit rate of the audio and video signals, as well as which data connection will be used for certain data. For example, video data may be sent via the WiFi connection, audio data via the 4G network and error protection data may be sent via the 3G network.

Figure 4:
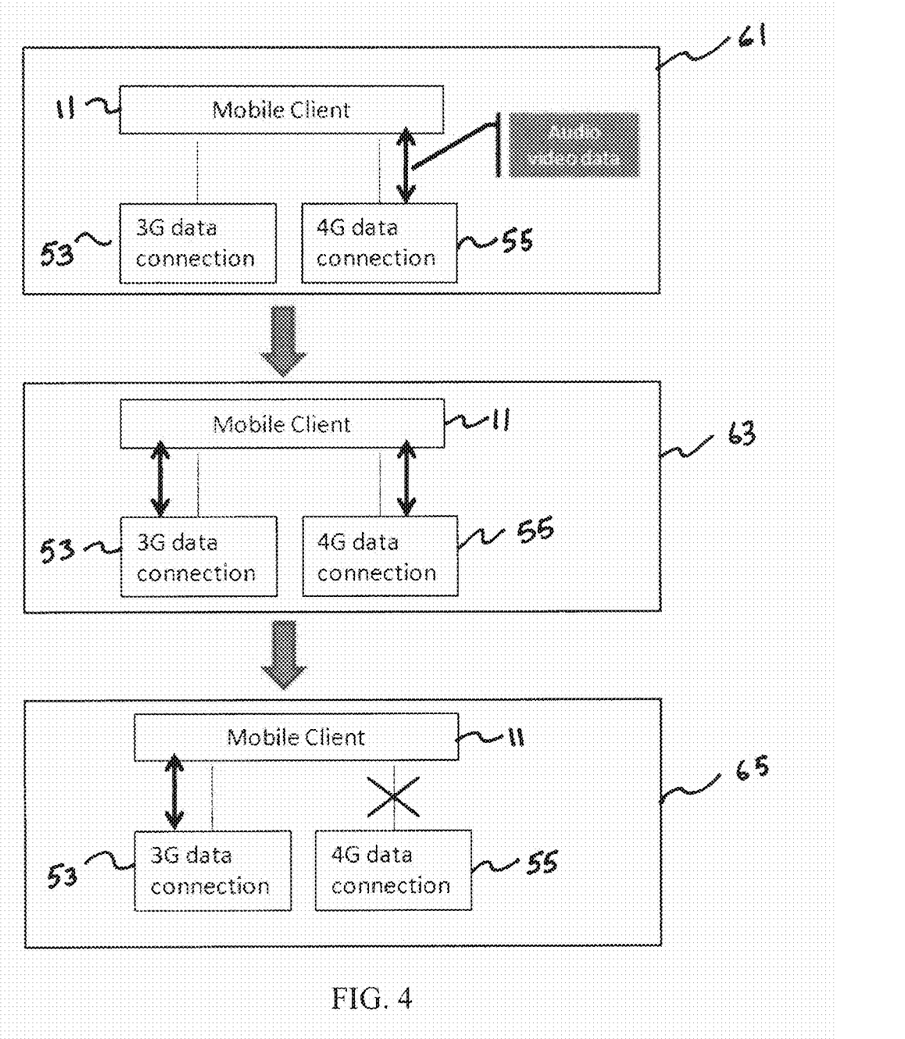
FIG. 4 shows a flow chart that schematically represents a method for application level hand over of a mobile video call, in accordance with an embodiment of the present invention.

FIG. 4 illustrates a flow chart that schematically represents a method for application level hand over of a mobile video call. A mobile client device 11 is shown connected to multiple data connections and the mobile video conferencing client is transmitting audio and video signals of the ongoing conferencing over the multiple connections concurrently. During a network switch event, one of the underlying networks may become unavailable. The mobile client device 11 senses such change and in accordance will switch to send data originally scheduled for the unavailable channel over other still available channel(s) as well as any newly available channel(s). The client will adjust the overall data transmission rate, if necessary, to make the data rate match the available bandwidth provided the currently available channels.

For example, with reference to FIG. 4, in a first instance 61, the available networks may only include a 4G network. In the first instance, the mobile client device 11 may be transmitting audio and video data on a 4G data connection 55. A first network switch event may occur such that in a second instance 63, both a 3G and 4G network connection may be available. In the second instance 63, the mobile client device 11 may transmit different types of data on each of the different networks. For example, audio data may be transmitted on the 3G network through the 3G data connection 53 and video data may be transmitted on the 4G network through the 4G data connection 55. A second network switch event may occur resulting in a third instance 65 in which the 4G network is unavailable and only the 3G network is available. In the third instance, both audio and video data may be transmitted on the 3G network through the 3G data connection 53.

Figure 5:
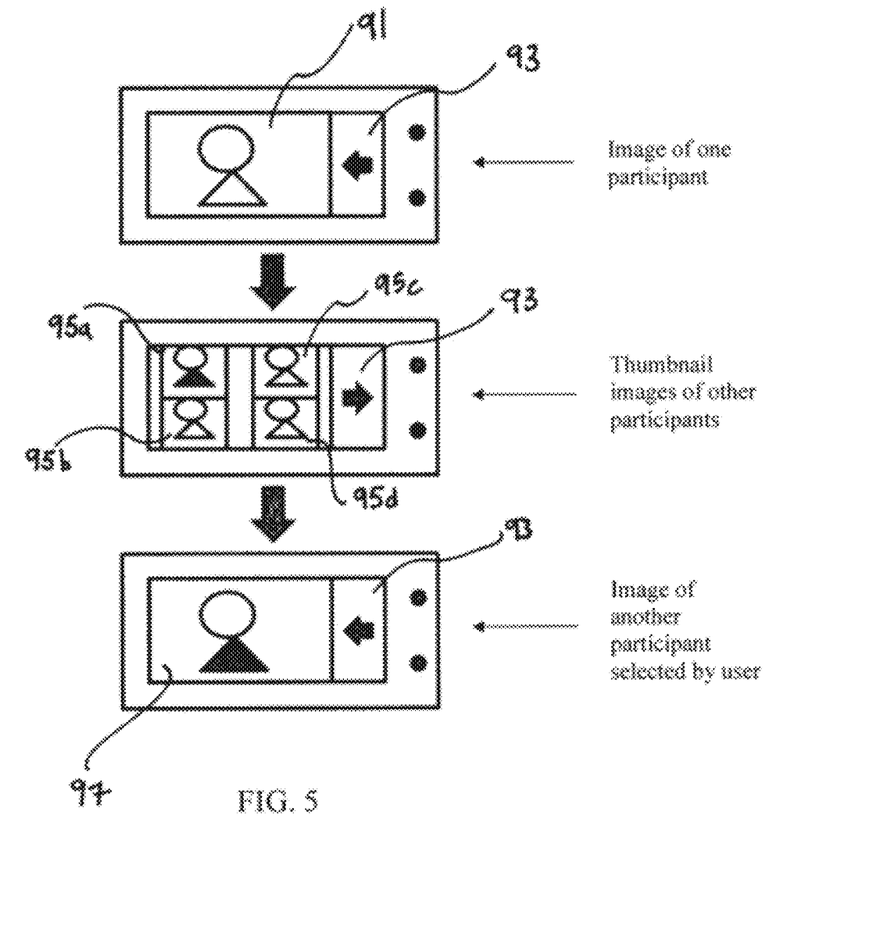
FIG. 5 shows a schematic, pictorial illustration of a system to manage video display during a multi-point video conferencing session, in accordance with an embodiment of the present invention.

FIG. 5 shows a pictorial illustration of a system to manage video display during a multi-point video conferencing session. During a multi-point video conference, the video images of only one of the participants 91 may be displayed on the mobile client device 11. In this example, other participants' video images are not shown. The respective video streams associated with non-displayed participants may be paused, or may be continuously received. A button, or similar user interface element 93, may be presented on the screen thereby allowing the mobile client device 11 user to display a new screen that shows thumbnail size images of other participants 95a-95d in the video conferencing session. The thumbnail image may be static, for example, by showing a picture ID associated with the particular party, or dynamically updated. The update frequency may be determined by a predefined refresh rate or when there is a triggering event, such as a scene change, detected in the corresponding video source. The update may be driven by the receiver or the sender side. The user may then select a thumbnail on the thumbnail screen. If the user selects a thumbnail, the mobile client device 11 may elevates the remote party corresponding to the selected thumbnail to the foreground and displays the full motion and size of the said party's video stream. The previous foreground participant replaces the newly elevated user on the thumbnail screen. In the example shown in FIG. 5, the user may be viewing a single participant 91 on the screen of the mobile client device 11. The user may select a user interface element 93 to display a new screen that shows thumbnail size images of other participants 95a-95d in the video conferencing session. The user may select a thumbnail size image 95a and in response, the mobile client device 11 may elevates the remote party corresponding to the selected thumbnail 95a to the foreground and display the full motion and size of the said party's video stream 97.

Figure 6:
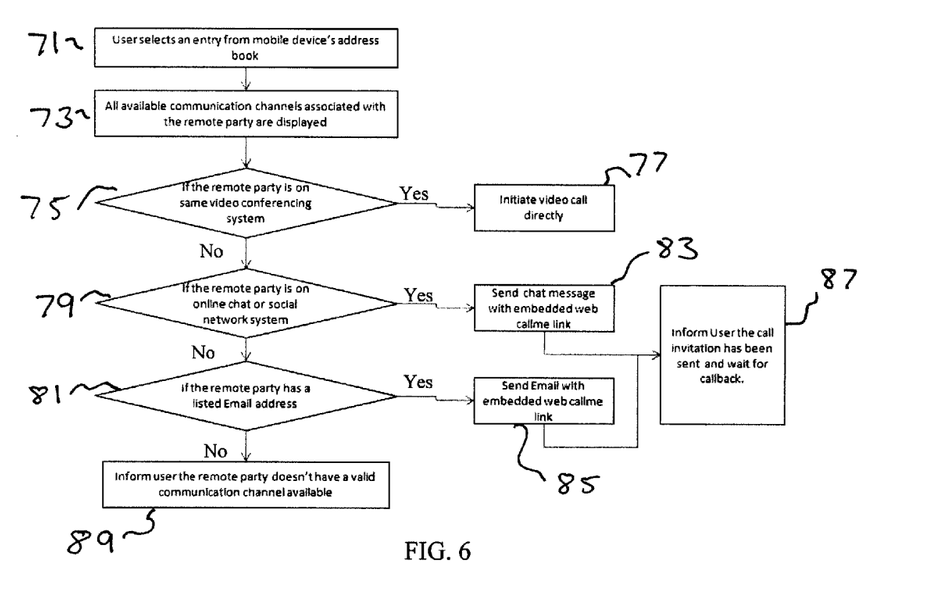
FIG. 6 shows a flow chart that represents a method for establishing a video communication session between a mobile client device and remote parties who are not registered on the same video conferencing system as the mobile client, in accordance with an embodiment of the present invention.

FIG. 6 illustrates a flow chart that represents a method for establishing a video communication session between a mobile client device and remote parties who are not registered on the same video conferencing system as the mobile client. In step 71, a user may open the address book on the mobile client device 11 and select an entry corresponding to the desired remote party with whom the user intended to establish a video communication session. In step 73, the address book lists the communication channels by which the remote party may be reached. For example, the address book may list a variety of ways to reach a party including the party's phone number, Email address, and one or several public chat (AOL, MSN, Yahoo, etc.) and social networking (such as facebook) identities. In step 75, if the intended party's address book already contains an identity registered on the same video conferencing system as the mobile video client (i.e., in-network user), a call invitation message is sent following the predefined in-network signaling protocol and the video call session proceeds, as shown by step 77.

If the intended party has not registered on the video conferencing system (i.e., out-of-network user) a textual message is sent to any or all of the listed communication identities associated with the remote party. For example, the textual message may be sent to the remote party's online chat or social network system profile, as shown by step 79 or e-mail address, as shown in step 81. For a textual message sent to the remote party's online chat or social network system profile, the textual message may be sent in the form of a chat message, as shown in step 83. For a textual message sent to a remote party's e-mail address, the textual message may be in the form of an e-mail as shown in step 85. Alternatively, the textual message may be sent to other communication identities of the remote party, such as in the form of an SMS message to the remote party's mobile client device. A web link is embedded into the textual message with accompanying instructions to initiate a video conference. The particular web link is a unique, pre-assigned property associated with each user of the video conferencing system. As shown in step 87, once the textual message is sent to the party, a message is sent to the user informing them that a call invitation has been sent to the party. In the event there are no available communication identities associated with the remote party, a message is sent to the user informing them that the remote party does not have a valid communication channel available, as shown in step 89.

Upon receiving the textual message, the remote party may open the textual message via one of the available communication channels, follows the in-message instruction and proceed to click on the embedded link upon which a web browser window may be opened. Necessary web plug-ins, downloaded if not already present on the personal computer, are then launched within this web video conferencing window and a call invitation message is sent to the mobile video client 11. The mobile video client device 11 receives the call notification and proceeds to join the video call with the remote party.

With reference to FIGS. 1-6, in one example, a first mobile client device 11a may initiate a video call request to a second mobile client device 11b. The second mobile client device 11b may accept the call. The first and second mobile client devices are connected and proceed to exchange encoded real time audiovisual data via an audio video server 19. The first mobile client device 11a receives audiovisual data from the second mobile client device 11b and decodes and displays the video on the screen of the first mobile client device 11a. The first mobile client device 11a also plays the audio from the second mobile client device 11b. The second mobile client device 11b receives audiovisual data from the first mobile client device 11a and decodes and displays the video on the screen of the second mobile client device 11b. The second mobile client device 11b plays the audio from the first mobile client device 11a.

The first mobile client device 11a may initiate a video call request to a third mobile client device (not shown) for joining the ongoing video conference between the first mobile client device 11a and the second mobile client device 11b. The third mobile client device may accept the call from the first mobile client device 11a. The third mobile client device proceeds to connect to the same audio video server 19 that the first and second mobile client devices 11a, 11b are connected to for exchanging media. The third mobile client may sends its encoded audiovisual data to the audio video server 19.

The audio video server 19 receives audiovisual data streams from the first mobile client device 11a, the second mobile client device 11b, and the third mobile client device. The audio video server 19 may decode all three audio streams and mix "n-1" individually mixed audio streams. The "n-1" individually mixed audio streams is a mix of all audio streams except the one stream generated from the client to which the particular mixed stream is going to be sent. For example, the individually mixed audio stream sent to the first mobile client device 11a may include audio streams from the second mobile client device 11b and the third mobile client device. Similarly, the individually mixed audio stream sent to the third mobile client device may include audio streams from the first mobile client device 11a and the second mobile client device 11b. The audio video server 19 may then send the individually mixed audio streams to the corresponding mobile clients. It is preferred that each mobile client device is able to hear all other mobile clients during a multipoint call.

In one exemplary configuration of the system 10, the audio video server 19 may send a video data stream generated from the third mobile client device to the first mobile client device 11a and the second mobile client device 11b and send a video stream generated by the first client mobile device 11a to the third client mobile device. In this configuration, the first mobile client device 11a and the second mobile client device 11b decode and display video from the third client mobile device and the third mobile client device decodes and displays video from the first client mobile device 11a.

In one example of the present system 10, the mobile client device 11 may display a visual cue, such as an icon, to indicate the call now contains more than 2 participants. The user of the mobile client device 11 may be able to act upon the visual cue, such as clicking or touching the conference icon, to see who is on the call. The user of the mobile client device 11 may be presented with textual description (such as name), graphic icons (such as avatar), or image thumbnails (such as user's profile thumbnail) to identify the other participants.

As noted above, a user can select a visual cue on the screen of the mobile client device 11 that relates to one of the participants on the call to see live video from the corresponding participant's mobile client device 11. For example, in the above configuration, a user on first mobile client device 11a selects a user associated with a second mobile client device 11b from the participant list. Upon selection, a request is sent from first mobile client device 11a to the audio video server 19 which then stops sending video stream generated from third mobile client device and starts to send video stream generated from the second mobile client device 11b to the first mobile client device 11a. The first mobile client device 11a is now displaying live video from the second mobile client device 11b. The second mobile client device 11a continues to display video from the third mobile client device, and the third mobile client device continues to display video from the first mobile client device 11a.

The audio video server 19 may continuously check to determine if there is no receiving request for a particular video upstream. If so, the server 19 may instruct the corresponding client to pause sending its video stream. If the stream is requested again by a mobile client device 11, the server 19 may instruct the corresponding client to resume sending its video stream.

In another example, the thumbnails 95a-95d representing additional conference participants are periodically updated with images sent live from the corresponding remote participant via the conference audio video server 19. The trigger for updating the thumbnail image can be based on time or other events such as scene change.

In yet another example, the decision as of which participant's video to display may be based not on manual selection by user but may be on algorithmically determined by the audio video server 19 based on a conferencing policy implemented on the audio video server 19. For example, it is contemplated that one policy could be to display video associated with the current active speaker on all participants' client devices. It is contemplated that another policy could be to display video based on selection made by an external conferencing management module (e.g., a moderator selects whose video to display).

It is also understood that in one example of the present system 10, the number of live video window on the mobile display can be more than one. For example, on a mobile client device 11 where the display is larger (such as for example a tablet), the system 10 can be configured to display more than one live video from remote conference participants, while still representing the rest of participants with thumbnail.

In another example of the system 10, a multipoint video call can contain clients with heterogeneous display capability and processing power. Some end points (e.g., a PC client) may be able to display all live video streams in a call while others (e.g., mobile client) may be limited to display one or a subset of video windows.

As shown by the above descriptions, aspects of the systems are implemented by one or more mobile devices or computers. The hardware elements, operating systems and programming languages of such devices are conventional in nature, and it is presumed that those skilled in the art are adequately familiar therewith. In some instances the functions of the device may be embodied in software, for example programmable instructions in memory, or hardware, or a combination of hardware and software. For example, the mobile device may have a microprocessor in a portable arrangement, such as, for example, a cellular phone, a smart phone, a personal digital assistant, an audio/video playing device, etc. In another example, the device maybe a PC based implementation of a central control processing system In addition, it is understood that the mobile client devices may run a variety of applications programs and store data, enabling one or more interactions via the user interface provided, and/or over one or more networks to implement the desired processing.

Software, code or a program may take the form of code or executable instructions for causing a device, or other programmable equipment to perform the relevant data processing steps, where the code or instructions are carried by or otherwise embodied in a medium readable by a mobile device or other device. Instructions or code for implementing such operations may be in the form of computer instruction in any form (e.g., source code, object code, interpreted code, etc.) stored in or carried by any readable medium.

It should be noted that various changes and modifications to the presently preferred embodiments described herein will be apparent to those skilled in the art. Such changes and modifications may be made without departing from the spirit and scope of the present invention and without diminishing its attendant advantages.

What is claimed is:

1. A non-transitory computer-readable medium having executable computer-readable program code embodied therein, the executable computer-readable program code for implementing a method for communication, the method comprising:
  establishing a video conference over a wireless communications network between a first participant using a mobile communication device and at least one other participant;
  displaying on a user interface of the mobile communication device a video image associated with the first participant; and
  displaying on the user interface of the mobile communication device a first selectable user interface element wherein selection of the first selectable user interface element during the video conference causes the user interface of the mobile communication device to automatically display a second selectable user interface element corresponding to a video image associated with a second participant;
  wherein selection of the second selectable user interface element during the video conference causes the user interface to automatically display only the video image associated with the second participant on the user interface of the mobile communication device.

2. The non-transitory computer-readable medium of claim 1 wherein the second selectable user interface element is a thumbnail image associated with the second participant.

3. The non-transitory computer-readable medium of claim 2 wherein the thumbnail image of the second participant is periodically updated with images associated with the video image associated with the second participant.

4. The non-transitory computer-readable medium of claim 1 wherein the mobile communication device receives, from a server, video data packets having data corresponding to the video image associated with the first participant and decodes the received data packets to display on the user interface of the mobile communication device the video image associated with the first participant.

5. The non-transitory computer-readable medium of claim 1 wherein the video image associated with the first participant is captured at a second mobile communication device and the video image associated with the second participant is captured at a third mobile communication device.

6. A method for communication between a server and one or more mobile communication devices, the method comprising:
  establishing a communication link for a video conference over a wireless communications network between a server, a first mobile communication device, a second communication device and a third communication device;
  transmitting to the first mobile communication device participating in the video conference a video image associated with a first participant;
  receiving at the server a request for transmission of a video image associated with a second participant;
  transmitting to the first mobile communication device the video image associated with the second participant in response to receiving at the server the request for transmission of the video image associated with the second participant;
  causing a user interface of the first mobile communication device to display the video image associated with the first participant;
  causing the user interface of the first mobile communication device to display a first selectable user interface element wherein selection of the first selectable user interface element during the video conference causes the user interface of the first mobile communication device to automatically display a second selectable user interface element corresponding to a video image associated with a second participant;
  transmitting to the first mobile communication device the video image associated with the second participant in response to selection of the second selectable user interface element;
  causing the user interface of the first mobile communication device to display only the video image associated with the second participant.

7. The method of claim 6 wherein the second selectable user interface element is a thumbnail image of the second participant.

8. The method of claim 7 wherein the thumbnail image of the second participant is periodically updated with images associated with the second participant video image associated with the second participant.

9. The method of claim 6 wherein the server receives the video image associated with the first participant from the second communication device and receives the video image associated with the second participant from the third communication device.

10. The method of claim 6 wherein the second communication device and the third communication device are mobile communication devices.

11. The method of claim 6 further comprising the step of stopping transmission to the first mobile communication device of the video image associated with the first participant when the server receives a request for transmission of the video image associated with the second participant from the first mobile communication device.

12. The method of claim 6 wherein the wireless communications network comprises at least one of 3G, 4G, and Wi-Fi networks.

13. The method of claim 6 wherein establishing a video conference over a wireless communications network comprises establishing a video conference over at least two wireless communications networks.

14. The method of claim 13 wherein establishing a video conference over at least two wireless communications networks happens in combination.

15. The method of claim 14 wherein the wireless communications network comprises at least one of 3G, 4G, and Wi-Fi networks.

16. The method of claim 6 wherein the wireless communications network comprises at least one of 3G, 4G, and Wi-Fi networks.

17. The method of claim 6 wherein establishing a video conference over a wireless communications network comprises establishing a video conference over at least two wireless communications networks.

18. The method of claim 17 wherein establishing a video conference over at least two wireless communications networks happens in combination.

19. The method of claim 18 wherein the wireless communications network comprises at least one of 3G, 4G, and Wi-Fi networks.

20. A non-transitory computer-readable medium having executable computer-readable program code embodied therein, the executable computer-readable program code for implementing a method for communication, the method comprising:
  establishing a communication link for a video conference over a wireless communications network between a server, a first mobile communication device, a second communication device and a third communication device;
  transmitting to the first mobile communication device participating in the video conference a video image associated with a first participant;
  receiving at the server a request for transmission of a video image associated with a second participant;
  transmitting to the first mobile communication device the video image associated with the second participant in response to receiving at the server the request for transmission of the video image associated with the second participant;
  causing a user interface of the first mobile communication device to display the video image associated with the first participant;
  causing the user interface of the first mobile communication device to display a first selectable user interface element wherein selection of the first selectable user interface element during the video conference causes the user interface of the first mobile communication device to automatically display a second selectable user interface element corresponding to a video image associated with a second participant;
  transmitting to the first mobile communication device the video image associated with the second participant in response to selection of the second selectable user interface element;
  causing the user interface of the first mobile communication device to display only the video image associated with the second participant.

21. The non-transitory computer-readable medium of claim 20 wherein the second selectable user interface element is a thumbnail image of the second participant.

22. The non-transitory computer-readable medium of claim 21 wherein the thumbnail image of the second participant is periodically updated with images associated with the second participant video image associated with the second participant.

23. The non-transitory computer-readable medium of claim 20 wherein the server receives the video image associated with the first participant from the second communication device and receives the video image associated with the second participant from the third communication device.

24. The non-transitory computer-readable medium of claim 20 wherein the second communication device and the third communication device are mobile communication devices.

25. The non-transitory computer-readable medium of claim 20 wherein the wireless communications network comprises at least one of 3G, 4G, and Wi-Fi networks.

26. The non-transitory computer-readable medium of claim 20 wherein establishing a video conference over a wireless communications network comprises establishing a video conference over at least two wireless communications networks.

27. The non-transitory computer-readable medium of claim 26 wherein establishing a video conference over at least two wireless communications networks happens in combination.

28. The non-transitory computer-readable medium of claim 27 wherein the wireless communications network comprises at least one of 3G, 4G, and Wi-Fi networks.

* * * * *